April 27, 1937. A. S. FITZ GERALD 2,078,792
ELECTRIC TIMING AND COUNTING DEVICE
Original Filed March 9, 1932

Inventor:
Alan S. FitzGerald,
by Harry E. Dunham
His Attorney.

Patented Apr. 27, 1937

2,078,792

UNITED STATES PATENT OFFICE 2,078,792

ELECTRIC TIMING AND COUNTING DEVICE

Alan S. Fitz Gerald, Wynnewood, Pa., assignor to General Electric Company, a corporation of New York Original application March 9, 1932, Serial No. 597,855. Divided and this application July 11, 1933, Serial No. 679,893

4 Claims. (Cl. 175—363)

This application is a division of my application, Serial No. 597,855, filed March 9, 1932, and both applications are assigned to the same assignee.

My invention relates to electric timing and counting devices and concerns particularly the employment of electrical means including discharge tubes as counting or timing elements. It is an object of my invention to provide apparatus responsive to time or time differences for controlling the timing of operations.

It is another object of my invention to provide a frequency converter or frequency divider for use in alternating current circuits and particularly for use when the ratio of conversion is large. This divisional application is directed primarily to frequency converters or frequency dividers, but other and further objects will become apparent as the description proceeds.

In carrying out my invention in its preferred form, two alternating-current circuits having an integral ratio between their frequencies are tied together by a condenser-type cycle-counting device. A charge-transferring condenser, a charge-collecting condenser, and current controlling devices, for example, electric discharge tubes, are so connected in relation to a source of charging current that the charge-transferring condenser is alternately charged and discharged at the frequency of the controlling frequency circuit, and charges are successively transferred to the charge-collecting condenser, which discharges after each group of a predetermined number of cycles of the controlling frequency circuit and initiates a cycle of the controlling frequency circuit. The features of my invention which I believe to be novel and patentable will be pointed out in the claims appended hereto.

Figure 1:
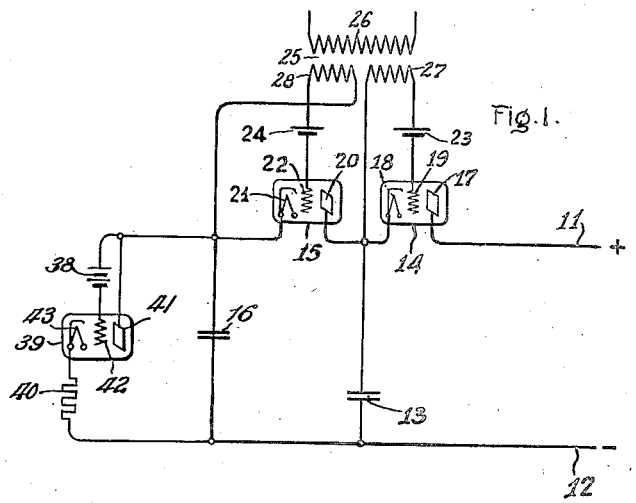
Figure 2:
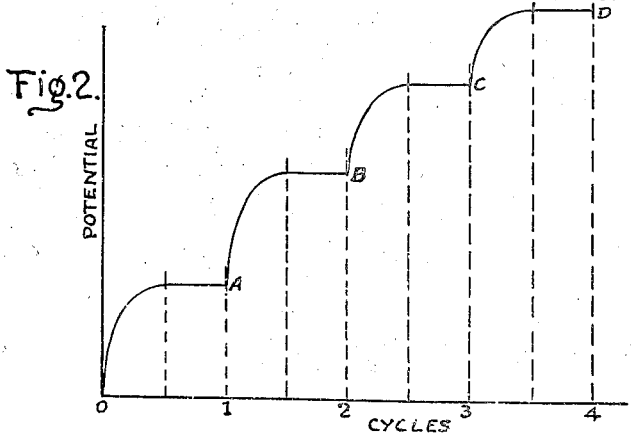

My invention itself, however, will be best understood by referring to the following description taken in connection with the accompanying drawing in which Fig. 1 represents schematically one form of counting or timing device which may also be used as the basis for frequency converting apparatus; Fig. 2 is a curve explaining the action of the apparatus; and Fig. 3 is a circuit diagram of a frequency-dividing arrangement including a modified form of the apparatus shown in Fig. 1.

Figure 3:
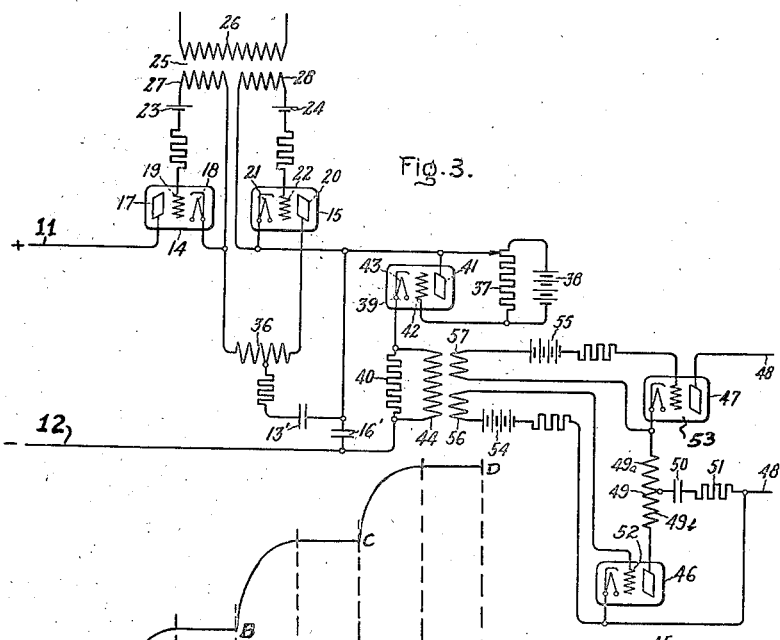

In the arrangement of Fig. 3, the frequency of alternating current generated in an inverter 45 is controlled by the frequency of an alternating-current circuit connected to the transformer winding 26 and having a frequency which is a predetermined multiple of the frequency to be produced by the inverter 45. The two frequencies are tied together by a condenser-type impulse counter, which initiates a cycle in the inverter 45 whenever a predetermined number of cycles of the circuit connected to the transformer winding 26 have been counted. The cycle counter included in the frequency-dividing arrangement may be either of the type disclosed in Fig. 1 or in Fig. 3, in which a condenser 16 or 16' discharges periodically to initiate a cycle in the inverter 45. In order that the general operation of the apparatus of Fig. 3 may more readily be understood, the cycle-counting arrangements of Figs. 1 and 3 will first be described. In the arrangement shown in Fig. 1 a charging current is supplied by a source which may, if desired, be a constant potential direct current source having a positive terminal 11 and a negative terminal 12. A charge transferring condenser 13 is connected to the source of current through a current controlling device, preferably a grid controlled discharge tube 14. A second current controlling device, preferably also a grid controlled discharge tube 15 and a charge collecting condenser 16 are connected in series across the terminals of the charge transferring condenser 13. Although I have shown a source of direct current for charging the condenser 13, my invention is obviously not limited thereto as an alternating current source can also be employed when a discharge tube or other inherently rectifying means is utilized as the current controlling means 14.

The tube 14 has its plate 17 connected to the positive terminal 11 of the direct current source and its cathode 18 connected to a terminal of the condenser 13. The passage of current through the tube 14 is controlled by the potential of the grid 19. Similarly, the tube 15 is provided with a plate 20 connected to cathode 18 of tube 14, a cathode 21 connected to one terminal of charge collecting condenser 16, and a control grid 22. The control grids 19 and 22 are normally biased to a potential below that of the corresponding cathodes 18 and 21 by means of suitable sources of voltage such as cells 23 and 24.

The potentials of the grids 19 and 22 are controlled by means of a transformer 25 having a primary winding 26 and oppositely connected secondary windings 27 and 28. The primary winding 26 may be connected to a source of alternating current causing the potentials of the grids 19 and 22 to vary oppositely in regularly recurring cycles.

Any suitable means responsive to the voltage across condenser 16 may be employed to give a response after a predetermined number of impulses have been given to the apparatus, after a current has flowed through winding 26 for a predetermined number of cycles or after a predetermined time has elapsed. Such means will be described more in detail in connection with Fig. 3.

As the polarities of the voltages produced by windings 27 and 28 reverse, the potentials of the grids 19 and 22 will vary alternately from potentials negative with respect to the cathodes 18 and 21 respectively to potentials positive with respect to the cathodes, thereby causing the tubes 14 and 15 to become alternately conducting and non-conducting. Since the windings 27 and 28 are oppositely connected tube 14 will be conducting when tube 15 is non-conducting and vice versa. Tubes 14 and 15 may be of any suitable type employing control grids including either the vacuum or vapor arc types. In either case the passage of current is controlled by the potential of the grids. Although I prefer to utilize grid controlled discharge tubes, my invention is not limited thereto but obviously includes the use of any suitable type of current controlling means.

Fig. 2 illustrates the action in case tubes of the vapor arc type are employed in which case each tube will conduct during one-half cycle and be non-conducting during the other half of the cycle of an alternating current source supplying winding 26, and the tube will change abruptly from non-conducting to the conducting condition as the grid becomes positive with respect to the cathode. During one-half cycle current will flow into the condenser 13 charging it to the potential existing between terminals 11 and 12. During the next half cycle tube 14 will be non-conducting, tube 15 will become conducting and the charge will be transferred from condenser 13 to condenser 16. If the condenser 16 has a greater capacity than condenser 13, a number of charges may be transferred from condenser 13 to condenser 16 before the potential of condenser 16 begins to approach that of the direct current source 11—12. In Fig. 2 the potential of condenser 16 is plotted against time measured in cycles of an alternating current source supplying winding 26. Referring to Fig. 2, it will be seen that during one half cycle as current is flowing into condenser 16 the potential across condenser 16 gradually rises following an exponential curve. During the next half cycle when tube 15 is non-conducting the potential will remain fixed, resulting in a series of curved and flat portions with steps at the points A, B, C, and D. If apparatus is connected to the condenser 16 which becomes conducting when the potential across condenser 16 equals that represented by the point D on the curve Fig. 2, the apparatus will respond after four cycles of alternating current have flowed in the winding 26.

In Fig. 3 I have shown another manner of connecting the apparatus shown in Fig. 1. In this case the condensers are connected in series instead of in parallel and are designated by the reference characters 13' and 16'. Condenser 13' has one terminal connected to the mid-point of a resistor 36 which joins cathode 18 of tube 14 to plate 20 of tube 15. Accordingly, a series circuit is formed from positive terminal 11 of the direct current source through tube 14, a portion of resistor 36, charge transferring condenser 13', charge collecting condenser 16', back to negative terminal 12 of the direct current source.

When the tube 14 becomes conducting currents will flow, charging condenser 13' and 16'. Initially, the distribution of potential between condensers 13' and 16' will depend upon the relative capacities of the condensers. When tube 15 becomes conducting condenser 13' will be discharged but the charge collected by condenser 16' will be retained. Each time tube 14 becomes conducting and condenser 13' is charged condenser 16' will be raised to a higher potential which is the same result produced by the arrangement shown in Fig. 1.

Either form of the cycle-counting apparatus shown in Figs. 1 and 3 may be utilized as the basis of other apparatus requiring timing means or counting means for its operation. It will be apparent that the number of impulses required to give a response is determined by the relative capacities of condensers 13 and 16 or 13' and 16', by the voltage of the source 11—12, and by the voltage at which the controlled apparatus is set to respond.

Fig. 3 represents also an arrangement in which an alternating current of one frequency may be converted to another of a lower frequency. After a predetermined number of cycles of one alternating current circuit, an impulse is produced which initiates a cycle in another alternating current circuit. In this arrangement additional apparatus is employed which times the second alternating current circuit in response to the frequency of the first alternating current circuit. After a predetermined number of cycles, the potential of condenser 16' raises the potential of the plate 41 and the grid 42 of a discharge tube 39 to the point where the tube 39 becomes conducting and the condenser 16' is discharged through the tube 39 and the resistor 40.

The momentary flow of current in resistor 40 momentarily creates a potential difference between the ends of the winding 44 of a transformer. After the condenser 16' is discharged the operation of the cycle counting device is repeated until the potential of the condenser 16' again reaches the predetermined value so that it is discharged through resistor 40 and another impulse is produced in winding 44 of the transformer. This operation is repeated indefinitely. An inverter 45 of any suitable type is provided in which each impulse of the winding 44 is arranged to start a flow of current in a suitable circuit in a reverse direction each time, thereby producing alternating currents having a fequency bearing a definite ratio to the frequency of the current flow in winding 26 of transformer 25.

I may, for example, use an inverter of the peak excitation type employing a pair of electric valves or discharge tubes 46 and 47 preferably of the vapor arc discharge type. The power required by the inverter is supplied by a direct current source 48. The tubes joined by a reactor 49 are connected in series across the terminals of the direct current source 48. A condenser 50 and a load 51 in series form a circuit from the mid-point of reactor 49 to one terminal of the direct current source 48. The tubes 46 and 47 have control electrodes, shown in the form of grids 52 and 53, which are normally negatively biased with respect to the cathodes of the tubes by means of batteries 54 and 55 respectively. The batteries 54 and 55 are connected to the secondary windings 56 and 57 which are in inductive relation with the winding 44.

Secondary windings 56 and 57 have voltages induced in them by the momentary flow of current through winding 44 which occurs whenever the condenser 16' is discharged. The windings 56 and 57 are so connected that these momentary voltages raise the potentials of the grids 52 and 53 momentarily above the potentials of the corresponding cathodes thereby making the tubes conducting in response to impulses sent through winding 44 from condenser 16'.

Although the grids 52 and 53 of tubes 46 and 47 become positive simultaneously causing both the tubes to be in a conducting condition at the same time, current actually flows in only one of the tubes at a time. The action is as follows: Assuming that the condenser 50 is initially discharged, when the voltage peaks are impressed on grids 52 and 53, the tubes become conducting momentarily. Owing to the fact that the circuit including the portion 49a of reactor 49, the condenser 50 and load 51 in series with direct current source 48 has a lower inductive reactance as a result of the capacity 50 than the circuit which includes the other portion 49b of the reactor 49, a current will tend to build up in the portion 49a before it does in the portion 49b. Since both portions have a common magnetic circuit, the same back voltage will be induced in each portion. The back voltage induced in 49b will be sufficient to suppress the current which would tend to start flowing in 49b and tube 46.

Owing to the inductive inertia effect on the current flowing in 49a, condenser 50, and load 51, which may be a tuned circuit, current will continue to flow after the condenser 50 has reached the potential of the direct current source 48. Consequently, condenser 50 will reach a potential higher than that of source 48 so that ultimately the current in tube 47 and reactor portion 49a is suppressed regardless of the conducting condition of tube 47. Since the tube 47 can pass current in only one direction, the condenser 50 cannot discharge through tube 47 back into the source 48.

The next time tubes 46 and 47 become conducting, condenser 50 will discharge through tube 46 causing a reversal of the current flowing in the load 51, but no current tends to flow from source 48 through tube 47 since the condenser 50 is at a higher potential than the source 48. The subsequent time the tubes become conducting current will again flow through tube 47, reactor portion 49a, condenser 50, and load 51, tending to charge the condenser 50 and suppressing as a result of the back voltage any tendency for current to flow in tube 46. In this manner the operation continues with the current flowing alternately in tubes 47 and 46 and the direction of current in load 51 being reversed each time the tubes become conducting. Although not essential to the operation it is desirable to choose values of inductance and capacity which provide a tuned circuit in order to obtain a current in load 51 having a sine wave shape. This action is repeated indefinitely and accordingly an alternating current is produced in the load 51 having a frequency which bears a predetermined relationship to the frequency in the source supplying winding 26 of transformer 25. Although I have shown the apparatus in connection with an inverter of the peak excitation type which is well known in the art, it will be understood that my invention is not limited thereto and may be used to control the operation and frequency of any suitable type of inverter.

In accordance with the provisions of the patent statutes I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. In combination with an alternating current circuit, an impulse responsive device comprising a source of current, a charge transferring condenser, and a grid controlled discharge tube connected in series, a second grid controlled discharge tube included in a circuit shunting said charge transferring condenser, a charge collecting condenser in circuit with said charge transferring condenser and charged in accordance with the charge of said charge transferring condenser, means for discharging said charge collecting condenser when it attains a given potential, an inverter of the grid controlled discharge tube type arranged to generate alternating currents at a frequency controlled by the rate at which said charge collecting condenser is charged and discharged, a transformer connected to said alternating current circuit having secondary windings arranged to modify in response to the reversals of polarity of said alternating current circuit the grid potentials of said discharge tubes alternately for the purpose of causing said tubes alternately to become conducting thereby alternately charging and discharging said charge transferring condenser and progressively charging said charge collecting condenser to successively higher potentials up to the discharge potential.

2. A frequency converter comprising in combination with an alternating current circuit, a charge collecting condenser, means for charging said condenser to successively higher potentials in response to successive cycles of said alternating current circuit, means for discharging said charge collecting condenser when it attains a given potential, and an alternating-current generator of the electric valve type having a control electrode to fix the frequency of such generator in proportion to the rate at which impulses are applied to said electrode, and means for applying an impulse to said control electrode in response to each discharge of said condenser, whereby the rate at which said condenser is charged and discharged determines the frequency of said generator.

3. In combination with an alternating current circuit, an impulse responsive device comprising a source of current, a charge transferring condenser receiving charges therefrom, means controlling the charging of said condenser, means controlling the discharging thereof, a charge collecting condenser in circuit with said charge transferring condenser and receiving charges in accordance with the charge of said charge transferring condenser, means for discharging said charge collecting condenser when it attains a given potential, and an inverter arranged to generate alternating currents at a frequency determined by the rate at which said charge collecting condenser is charged and discharged, said controlling means being arranged alternately to charge and discharge said charge transferring condenser in response to reversals of polarity of said alternating current circuit and progressively to charge said charge collecting condenser to successively higher potentials with successive cycles of said alternating current.

4. A frequency converter comprising in combination with an alternating current circuit, a charge transferring condenser, a charge collecting condenser in circuit therewith, means for alternately charging and discharging said transferring condenser and charging said charge collecting condenser by an amount dependent upon the charge of the first condenser to successively higher potentials in response to successive cycles of said alternating current circuit, means for discharging said charge collecting condenser when it attains a given potential, and an inverter arranged to generate alternating currents at a frequency controlled by the rate at which said charge collecting condenser is charged and discharged.

ALAN S. FITZ GERALD.